United States Patent
Catt et al.

(10) Patent No.: US 9,449,438 B2
(45) Date of Patent: *Sep. 20, 2016

(54) METHODS FOR PREDICTING A SPEED BRAKE SYSTEM FAULT

(71) Applicant: GE Aviation Systems Limited, Cheltenham (GB)

(72) Inventors: Christopher Joseph Catt, Southampton (GB); Julia Ann Howard, Lee-On-The-Solent (GB)

(73) Assignee: GE AVIATION SYSTEMS LIMITED (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/536,898

(22) Filed: Nov. 10, 2014

(65) Prior Publication Data

US 2015/0066288 A1 Mar. 5, 2015

Related U.S. Application Data

(63) Continuation of application No. 14/065,967, filed on Oct. 29, 2013, now Pat. No. 8,909,393.

(30) Foreign Application Priority Data

Apr. 16, 2013 (GB) .................................. 13068713

(51) Int. Cl.
| | |
|---|---|
| B64C 19/00 | (2006.01) |
| B64F 5/00 | (2006.01) |
| B64D 45/00 | (2006.01) |
| G07C 5/00 | (2006.01) |

(Continued)

(52) U.S. Cl.
CPC ............. *G07C 5/0816* (2013.01); *B64C 9/323* (2013.01); *B64C 19/00* (2013.01); *B64D 45/0005* (2013.01); *B64F 5/0045* (2013.01); *G01M 17/00* (2013.01)

(58) Field of Classification Search
USPC ........... 701/3, 9, 14; 244/75.1; 340/945, 963
See application file for complete search history.

(56) References Cited

U.S. PATENT DOCUMENTS

| | | |
|---|---|---|
| 3,839,860 A | 10/1974 | Martin |
| 4,363,098 A | 12/1982 | Buus et al. |

(Continued)

FOREIGN PATENT DOCUMENTS

| | | |
|---|---|---|
| CN | 101911417 A | 12/2010 |
| CN | 102062619 A | 5/2011 |

(Continued)

OTHER PUBLICATIONS

Unofficial English Translation of Japanese Office Action issued in connection with corresponding JP Application No. 2014081506 on Mar. 24, 2015.

(Continued)

*Primary Examiner* — Yonel Beaulieu
(74) *Attorney, Agent, or Firm* — GE Global Patent Operation; William S. Munnerlyn (57) ABSTRACT

Methods of predicting a speed brake fault in an aircraft having a speed brake system including multiple control surfaces, a handle for setting the position of the multiple control surfaces, and at least one control surface position sensor, the methods include receiving a position signal from the at least one position sensor, determining a variation in the position signal and predicting a fault in the speed brake system.

16 Claims, 4 Drawing Sheets

(51) Int. Cl.
  *G06F 11/00* (2006.01)
  *G06F 11/07* (2006.01)
  *G07C 5/08* (2006.01)
  *B64C 9/32* (2006.01)
  *G01M 17/00* (2006.01)

(56) References Cited

U.S. PATENT DOCUMENTS

| | | | |
|---|---|---|---|
| 4,398,687 A | 8/1983 | Nichols, Jr. et al. | |
| 4,674,716 A | 6/1987 | Moore | |
| 5,719,566 A | 2/1998 | Readman et al. | |
| 6,112,141 A | 8/2000 | Briffe et al. | |
| 6,226,597 B1 | 5/2001 | Eastman et al. | |
| 6,243,628 B1* | 6/2001 | Bliley et al. | 701/29.4 |
| 6,292,723 B1 | 9/2001 | Brogan et al. | |
| 6,502,085 B1 | 12/2002 | Adibhatla et al. | |
| 6,557,400 B2 | 5/2003 | Xiong et al. | |
| 6,640,560 B2 | 11/2003 | Rohrbach et al. | |
| 6,721,631 B2 | 4/2004 | Shimizu et al. | |
| 6,845,306 B2 | 1/2005 | Henry et al. | |
| 7,006,947 B2* | 2/2006 | Tryon, III | G06F 11/008 702/183 |
| 7,824,147 B2 | 11/2010 | Morris et al. | |
| 7,853,370 B2 | 12/2010 | Coulmeau et al. | |
| 8,285,438 B2 | 10/2012 | Mylaraswamy et al. | |
| 8,306,778 B2 | 11/2012 | Leao et al. | |
| 8,798,848 B2 | 8/2014 | Gu et al. | |
| 8,909,393 B2* | 12/2014 | Catt et al. | 701/3 |
| 8,918,297 B2 | 12/2014 | Nakagawa | |
| 2002/0138184 A1 | 9/2002 | Kipersztok et al. | |
| 2004/0139751 A1 | 7/2004 | Liu et al. | |
| 2005/0096873 A1 | 5/2005 | Klein | |
| 2005/0222747 A1 | 10/2005 | Vhora et al. | |
| 2007/0044551 A1 | 3/2007 | Fogelstrom | |
| 2007/0080261 A1 | 4/2007 | Neumann et al. | |
| 2007/0234734 A1 | 10/2007 | Uluyol et al. | |
| 2010/0057320 A1 | 3/2010 | Whittingham | |
| 2010/0147399 A1 | 6/2010 | Buhring | |
| 2010/0152925 A1 | 6/2010 | Goupil et al. | |
| 2010/0158068 A1 | 6/2010 | Monteiro | |
| 2010/0168982 A1 | 7/2010 | Maalioune | |
| 2010/0242434 A1 | 9/2010 | Bader et al. | |
| 2011/0016846 A1 | 1/2011 | Maalioune | |
| 2011/0040470 A1 | 2/2011 | Qiu et al. | |
| 2011/0062282 A1 | 3/2011 | Richter et al. | |
| 2011/0255968 A1* | 10/2011 | Recksiek | 416/23 |
| 2012/0101776 A1 | 4/2012 | Brower et al. | |
| 2012/0101793 A1 | 4/2012 | Cheriere et al. | |
| 2012/0206334 A1 | 8/2012 | Osterhout | |
| 2012/0221262 A1 | 8/2012 | Nakagawa | |
| 2012/0287960 A1 | 11/2012 | Thompson et al. | |
| 2012/0330495 A1 | 12/2012 | Geib et al. | |
| 2013/0082149 A1 | 4/2013 | Boucaud et al. | |
| 2013/0179028 A1 | 7/2013 | Gu et al. | |
| 2014/0001313 A1 | 1/2014 | Lam et al. | |
| 2014/0336872 A1 | 11/2014 | Howard | |

FOREIGN PATENT DOCUMENTS

| | | |
|---|---|---|
| CN | 202582786 U | 12/2012 |
| EP | 0811794 A2 | 12/1997 |
| EP | 1455313 A1 | 9/2004 |
| EP | 1746024 A1 | 1/2007 |
| EP | 1945506 A2 | 7/2008 |
| EP | 2018321 A1 | 1/2009 |
| EP | 2199202 A2 | 6/2010 |
| EP | 2323005 A1 | 5/2011 |
| EP | 2570880 A2 | 3/2013 |
| GB | 2378248 A | 2/2003 |
| JP | 5747298 A | 3/1982 |
| JP | 3074247 A | 3/1991 |
| JP | 1995096897 A | 4/1995 |
| JP | 1999222198 A | 8/1998 |
| JP | 2000514382 A | 10/2000 |
| JP | 2001507144 A | 5/2001 |
| JP | 2001193477 A | 7/2001 |
| JP | 2001206295 A | 7/2001 |
| JP | 2001329861 A | 11/2001 |
| JP | 2002202003 A | 7/2002 |
| JP | 2004272375 A | 9/2004 |
| JP | 2006057595 A | 3/2006 |
| JP | 2007309321 A | 11/2007 |
| JP | 2012176645 A | 9/2012 |
| JP | 2013018482 A | 1/2013 |
| WO | 2009088500 A1 | 7/2009 |

OTHER PUBLICATIONS

Combined Search and Examination Report for counterpart GB13024294, Jun. 28, 2013.

Search Report for Counterpart GB13068713, Oct. 9, 2013.

Unofficial English Translation of Japanese Office Action issued in connection with corresponding JP Application No. 2014-081508 on Apr. 7, 2015. This JP case is a foreign counterpart to related U.S. Appl. No. 14/254,125.

Combined Search and Examination Report issued on Jun. 28, 2013 for GB13024294, which is the foreign counterpart to related U.S. Appl. No. 14/152,241.

Unofficial English Translation of Japanese Office Action issued on Mar. 24, 2015 in connection with corresponding JP Application No. 2014081506, which is the foreign counterpart to related U.S. Appl. No. 14/152,241.

GB Combined Search & Examination Report issued in connection with related GB Application No. 1306869.7 on Sep. 30, 2013.

Unofficial English Translation of Chinese Office Action issued in connection with related CN Application No. 201410152997.2 on Oct. 9, 2015.

Unofficial English Translation of Chinese Office Action issued in connection with corresponding CN Application No. 201410152541.6 on Oct. 20, 2015.

Canadian Office Action issued in connection with related CA Application No. 2848087 on Oct. 28, 2015.

Office Action issued in connection with corresponding CA Application No. 2848110 on Feb. 25, 2016.

Unofficial translation of JP Office Action issued on Mar. 14, 2016 in connection to related JP Application 2014-081508.

US Final Office Action issued in connection with related U.S. Appl. No. 14/254,125 on Apr. 22, 2016.

* cited by examiner

METHODS FOR PREDICTING A SPEED BRAKE SYSTEM FAULT

CROSS-REFERENCE TO RELATED APPLICATIONS

This application is a continuation of U.S. Pat. No. 8,909,393 (patent application Ser. No. 14/065,9671, filed Oct. 29, 2013, which claims priority under 35 U.S.C. §119 to British Publication No. GB2513133 (Patent Application No. 130687131, filed Apr. 16, 2013, the disclosure of which is incorporated herein by reference in its entirety.

BACKGROUND OF THE INVENTION

Contemporary aircraft may include speed brake systems, which may include control surfaces on each wing. The use of the control surfaces may increase drag to aid in the reduction of airspeed for a given thrust, which is especially beneficial during landing of the aircraft. Currently, after a fault occurs with the system, airlines or maintenance personnel attempt to identify the cause and fix it either during scheduled or most likely during unscheduled maintenance.

BRIEF DESCRIPTION OF THE INVENTION

In one embodiment, the invention relates to a method of predicting a speed brake fault in an aircraft having a speed brake system including multiple control surfaces, a handle for setting the position of the multiple control surfaces, and at least one spoiler position sensor, the method includes receiving a position signal from the at least one position sensor indicative of a position of at least one of the multiple control surfaces, comparing the position signal to a reference position value to define a position comparison, determining from the position comparison a variation parameter indicative of the variation of the position signal from the reference position value, comparing the variation parameter to a variation reference value to define a variation comparison, predicting a fault in the speed brake system based on the variation comparison, and providing an indication of the predicted fault.

In another embodiment, the invention relates to a method of predicting a speed brake fault in an aircraft having a speed brake system including multiple control surfaces, a handle for setting the position of the multiple control surfaces, and at least one spoiler position sensor, the method includes receiving a position signal from at least one position sensor, determining a variation in the position signal relative to a reference position, predicting a fault in the speed brake system based on the variation, and providing an indication of the predicted fault.

DESCRIPTION OF EMBODIMENTS OF THE INVENTION

Figure 1:
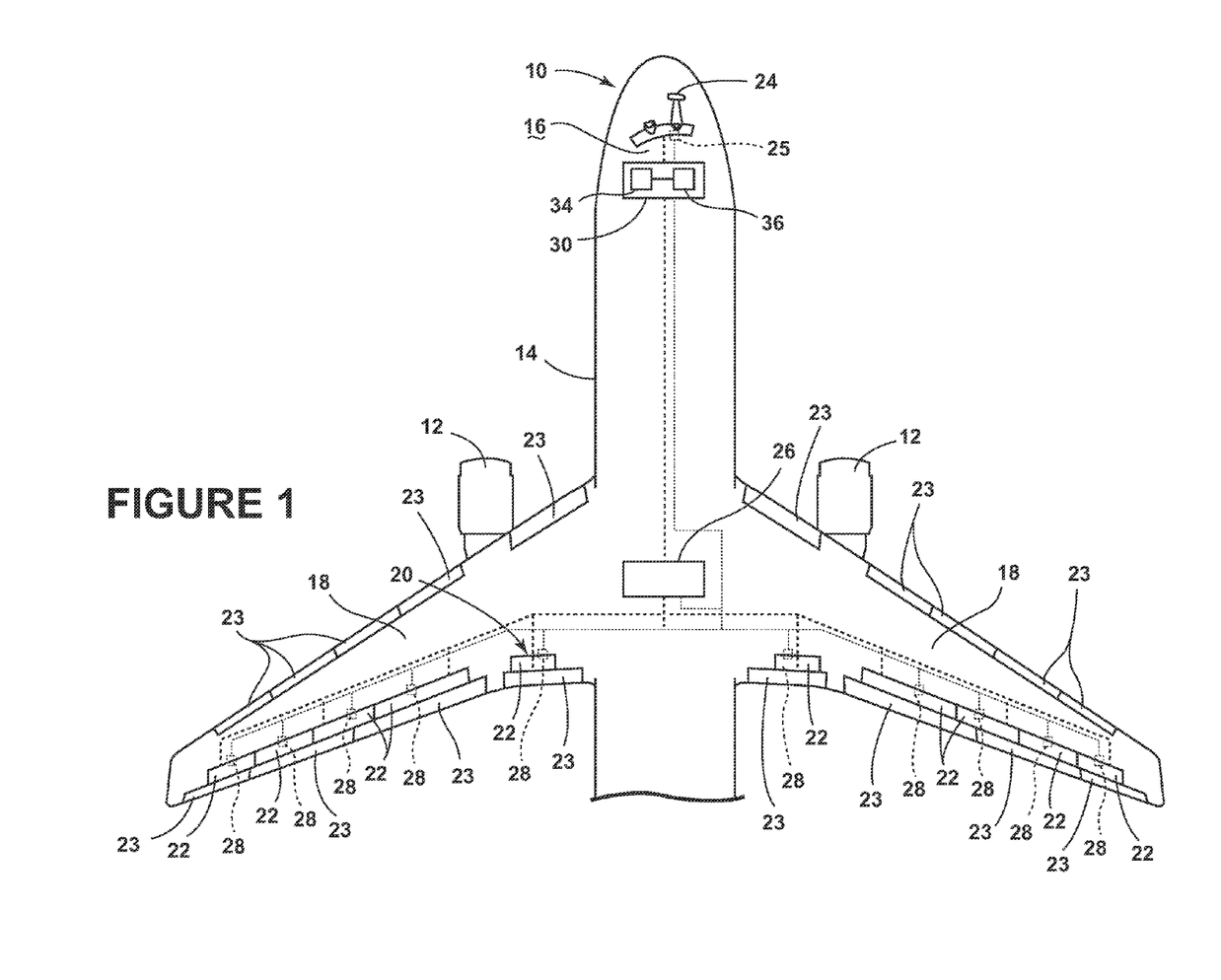
FIG. 1 is a schematic view of an aircraft having an exemplary speed brake system.

FIG. 1 schematically depicts a portion of an aircraft 10 that may execute embodiments of the invention and may include one or more propulsion engines 12 coupled to a fuselage 14, a cockpit 16 positioned in the fuselage 14, and wing assemblies 18 extending outward from the fuselage 14. A speed brake system 20 is included in the aircraft 10 and includes multiple control surfaces or spoilers 22 on each of the wing assemblies 18. The multiple spoilers 22 may include hinged surfaces mounted on each of the wing assemblies 18 to reduce the speed the aircraft 10 and to increase the angle of descent for landing. The term spoiler is meant to include any control surface in the speed brake system 20 that increases the profile drag of the aircraft 10. While multiple spoilers have been illustrated it will be understood that the speed brake may be a single dedicated control surface. There are many different types of control surfaces and their use may depend on the size, speed, and complexity of the aircraft 10 on which they are to be used. Further, on some aircraft, they are hinged to and faired with the side or bottom of the fuselage Regardless of their location, their purpose is the same. Such differing speed brake types are not germane to the embodiments of the invention and will not be described further herein. Further, while four spoilers 22 have been illustrated on each of the wing assemblies 18 it may be understood that there may be any number of spoilers 22 included in the speed brake system 20. Additional control surfaces 23, which serve other purposes including trailing edge flaps and forward edge slats, have been illustrated.

A speed brake handle 24 may be included in the cockpit 16 and may be operated by a pilot to set the position of the multiple spoilers 22. The speed brake handle 24 may provide an input to a speed brake drive 26, which may be used to move the multiple spoilers 22 into the position set by the speed brake handle 24. The term speed brake handle as used in this description is not limited to a physical brake handle, rather it relates to the control device used to set the position of the speed brakes. Throughout the early part of aviation, this control device was a handle and the term speed brake handle has now become generic to the control device used to set the speed brake position, regardless of whether the control device is an actual handle or a button on a touchscreen user interface. Therefore, the specific drive mechanisms may vary and have not been illustrated for the sake of clarity.

A speed brake handle sensor 25 or other suitable mechanism may be used for determining the position of the speed brake handle 24; that is, the set position of the speed brakes. In most aircraft, the speed brakes have a predetermined number of set positions, which correspond to different flight phases. While the speed brakes can be variably, even infinitely adjustable, typically the speed brakes have a predetermined number of fixed positions.

Further, one or more speed brake or control surface position sensors 28 may be included in the speed brake system 20 and each may output a position signal indicative of the position of at least one of the multiple spoilers 22. For example, a skew sensor may be operably coupled to each of the multiple spoilers 22 and indicate the angle of each of the multiple spoilers 22.

Figure 2:
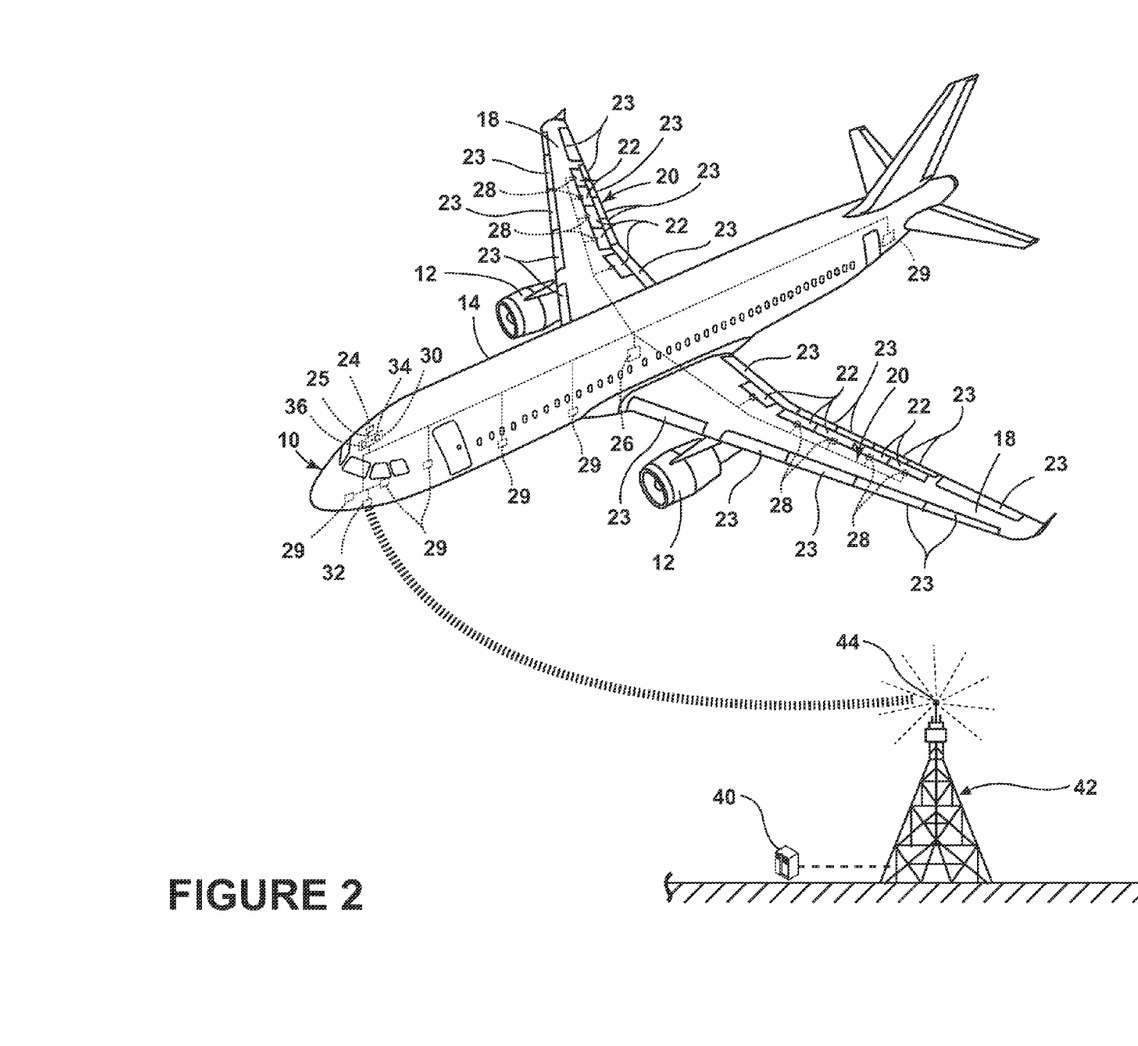
FIG. 2 is a perspective view of the aircraft of FIG. 1 and a ground system in which embodiments of the invention may be implemented.

Referring now to FIG. 2, it may more easily be seen that a plurality of additional aircraft systems 29 that enable proper operation of the aircraft 10 may also be included in the aircraft 10 as well as a controller 30, and a communication system having a wireless communication link 32. The controller 30 may be operably coupled to the plurality of aircraft systems 29 including the speed brake system 20. For example, the speed brake drive 26, the speed brake handle 24, the speed brake handle sensor 25, and the one or more speed brake position sensors 28 may be operably coupled to the controller 30. Further, the position signal may be stored in a storage device on the aircraft 10 and accessed by the controller 30.

The controller 30 may also be connected with other controllers of the aircraft 10. The controller 30 may include memory 34, the memory 34 may include random access memory (RAM), read-only memory (ROM), flash memory, or one or more different types of portable electronic memory, such as discs, DVDs, CD-ROMs, etc., or any suitable combination of these types of memory. The controller 30 may include one or more processors 36, which may be running any suitable programs. The controller 30 may be a portion of an FMS or may be operably coupled to the FMS.

A computer searchable database of information may be stored in the memory 34 and accessible by the processor 36. The processor 36 may run a set of executable instructions to display the database or access the database. Alternatively, the controller 30 may be operably coupled to a database of information. For example, such a database may be stored on an alternative computer or controller. It will be understood that the database may be any suitable database, including a single database having multiple sets of data, multiple discrete databases linked together, or even a simple table of data. It is contemplated that the database may incorporate a number of databases or that the database may actually be a number of separate databases.

The database may store data that may include historical data related to the multiple spoilers 22 for the aircraft 10 as well as historical speed brake data related to a fleet of aircraft. The database may also include reference values including predetermined reference position values for the angle of multiple spoilers 22 when the speed brake handle 24 is in a variety of positions and variation reference values.

Alternatively, it is contemplated that the database may be separate from the controller 30 but may be in communication with the controller 30 such that it may be accessed by the controller 30. For example, it is contemplated that the database may be contained on a portable memory device and in such a case, the aircraft 10 may include a port for receiving the portable memory device and such a port would be in electronic communication with the controller 30 such that the controller 30 may be able to read the contents of the portable memory device. It is also contemplated that the database may be updated through the wireless communication link 32 and that in this manner, real time information such as information regarding historical fleet wide data may be included in the database and may be accessed by the controller 30.

Further, it is contemplated that such a database may be located off the aircraft 10 at a location such as airline operation center, flight operations department control, or another location. The controller 30 may be operably coupled to a wireless network over which the database information may be provided to the controller 30.

While a commercial aircraft has been illustrated, it is contemplated that portions of the embodiments of the invention may be implemented anywhere including in a controller or computer 40 at a ground system 42. Furthermore, database(s) as described above may also be located in a destination server or a computer 40, which may be located at and include the designated ground system 42. Alternatively, the database may be located at an alternative ground location. The ground system 42 may communicate with other devices including the controller 30 and databases located remote from the computer 40 via a wireless communication link 44. The ground system 42 may be any type of communicating ground system 42 such as an airline control or flight operations department.

One of the controller 30 and the computer 40 may include all or a portion of a computer program having an executable instruction set for predicting a speed brake fault in the aircraft 10. Such predicted faults may include improper operation of components as well as failure of components. As used herein the term "predicting" refers to a forward looking determination that makes the fault known in advance of when the fault occurs and contrasts with detecting or diagnosing, which would be a determination after the fault has occurred. Regardless of whether the controller 30 or the computer 40 runs the program for predicting the fault, the program may include a computer program product that may include machine-readable media for carrying or having machine-executable instructions or data structures stored thereon. Such machine-readable media may be any available media, which can be accessed by a general purpose or special purpose computer or other machine with a processor. Generally, such a computer program may include routines, programs, objects, components, data structures, algorithms, etc. that have the technical effect of performing particular tasks or implementing particular abstract data types. Machine-executable instructions, associated data structures, and programs represent examples of program code for executing the exchange of information as disclosed herein. Machine-executable instructions may include, for example, instructions and data, which cause a general purpose computer, special purpose computer, or special purpose processing machine to perform a certain function or group of functions.

It will be understood that the aircraft 10 and computer 40 merely represent two exemplary embodiments that may be configured to implement embodiments or portions of embodiments of the invention. During operation, either the aircraft 10 and/or the computer 40 may predict a speed brake fault. By way of non-limiting example, while the aircraft 10 is being operated, the speed brake handle 24 may be utilized to set the position of the multiple spoilers 22. The speed brake handle sensor 25 may output a signal indicative of the position of the speed brake handle 24 and the speed brake position sensors 28 may output a position signal indicative of the position of the multiple spoilers 22. Each of the multiple spoilers 22 should behave the same when the speed brake handle 24 sets the position of the multiple spoilers 22 as it is not possible to set the spoilers 22 differently.

The controller 30 and/or the computer 40 may utilize inputs from the speed brake handle sensor 25, the speed brake position sensors 28, the database(s) and/or information from airline control or flight operations department to predict the speed brake fault Among other things, the controller 30 and/or the computer 40 may analyze the data output by the speed brake position sensors 28 over time to determine drifts or trends in the operation of the speed brake system 20. Such drifts and trends in the data may be too subtle on a day-to-day comparison to make such predictions of fault. The controller 30 and/or the computer 40 may also analyze the speed brake data to determine differences between the movement of the spoilers 22 and discrepancies between where the speed brake handle 24 has set the position and the actual position of the multiple spoilers 22 to predict faults in the speed brake system 20. The controller 30 and/or computer 40 may also determine the time it takes each of the multiple spoilers 22 to reach a specific position and determine timing differences based thereon. Thus, it will be understood that the controller 30 and/or the computer 40 may make any number of comparisons to determine differences with various thresholds to predict faults in the speed brake system 20. Once a speed brake fault has been predicted, an indication may be provided on the aircraft 10 and/or at the ground system 42. It is contemplated that the prediction of the speed brake fault may be done during flight, may be done post flight, may be done at the end of the day after any number of flights, or may be done after any number of flights. The wireless communication link 32 and the wireless communication link 44 may both be utilized to transmit data such that the fault may be predicted by either the controller 30 and/or the computer 40.

Figure 3:
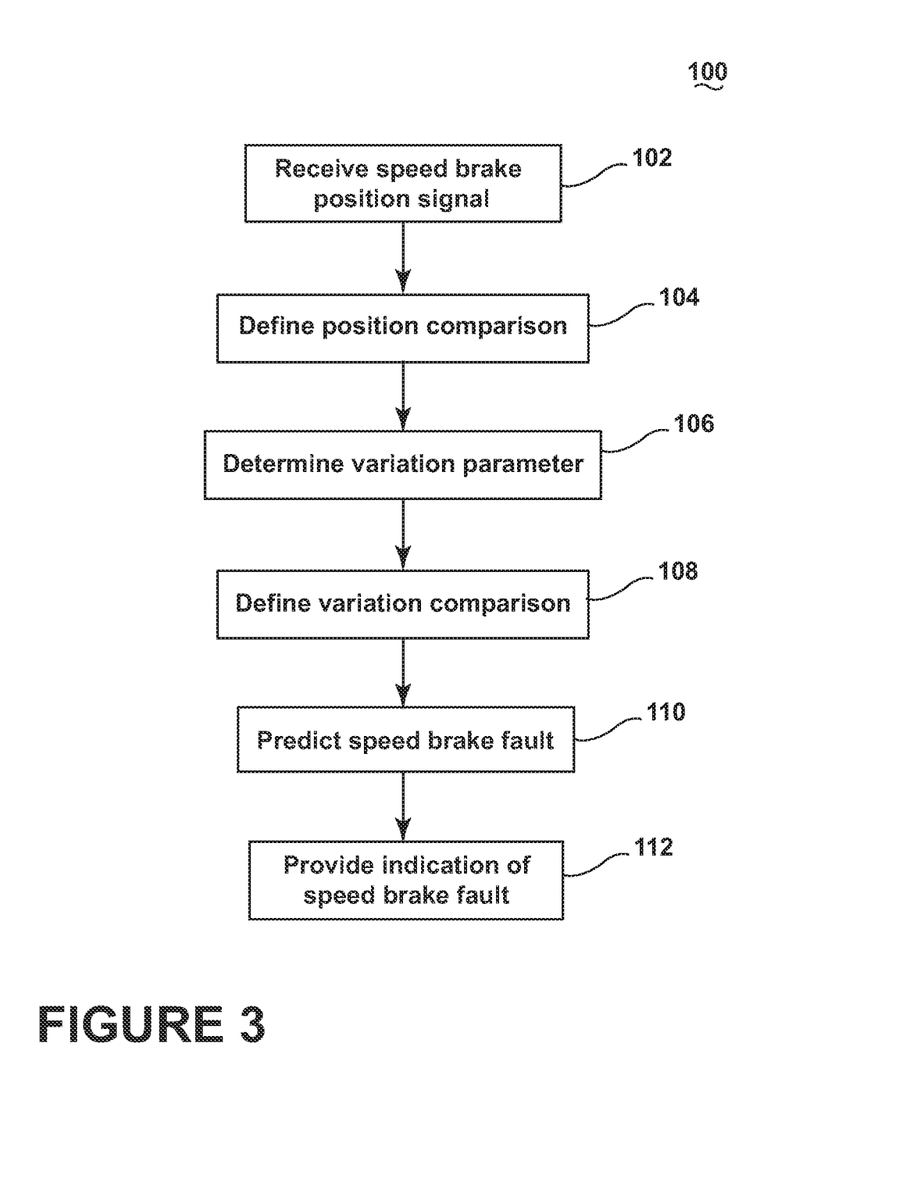
FIG. 3 is a flowchart showing a method of predicting a speed brake fault in an aircraft according to an embodiment of the invention.

In accordance with an embodiment of the invention, FIG. 3 illustrates a method 100, which may be used for predicting a speed brake fault, which can include a failure. The method 100 begins at 102 by receiving a position signal from at least one of the one of the speed brake position sensors 28, which is indicative of a position of at least one of the multiple spoilers 22. Alternatively, this may include receiving multiple position signals from the speed brake position sensors 28, with each position signal corresponding to a different one of the multiple spoilers 22.

At 104, the position signal may be compared to a reference position value to define a position comparison. The reference position value may include any number of reference values related to the speed brake system 20. For example, the reference position value may include a value related to a position of any of the multiple spoilers 22, historical information regarding the position of at least one of the multiple spoilers 22, and theoretical information regarding the position of at least one of the multiple spoilers. For example, the theoretical information may include a set position or predetermined position for one of the multiple spoilers 22. Furthermore, the reference position value may include a speed brake handle position. In such an instance, the method may include determining a position of the speed brake handle 24 such as by receiving an output from the speed brake handle sensor 25 to define the reference position value. Alternatively, the reference position values may be stored in one of the database(s) as described above.

In this manner, the position signals received from the speed brake position sensors 28 may be compared to a reference value to define a position comparison. For example, the position comparison may include comparing at least two of the multiple position signals, with one of the multiple position signals being treated as the reference position value. Any number of comparisons may be made and a variation parameter may be determined from the position comparison as indicated at 106. The variation parameter is indicative of the variation of the position signal from the reference position value. In this manner a variation parameter may be determined for the comparison between a position of a spoiler 22 and the speed brake handle position, a variation parameter may be determined for the comparison between a position of a spoiler 22 and a predetermined position value or spoiler angle, a variation parameter may be determined for the comparison between a position of a spoiler and a historical spoiler angle value, etc.

At 108, the variation parameter, as determined at 106, may be compared to a variation reference value to define a variation comparison. The variation reference value may include at least one threshold value for the comparison. Such a variation reference value may be any suitable value. For example, the variation reference value for the position comparison may be defined based on the tolerance for the various components being compared including the tolerance for the sensors being used. For example, if the position comparison includes comparing a position signal of one of the multiple spoilers 22 to a reference value then the variation reference value may be defined by tolerances for the spoilers 22 and/or the speed brake position sensors 28. Alternatively, if the controller 30 and/or the computer 40 is tracking the variation over time of each set speed brake position to the sensed speed brake position, then the variation reference value may be related to an acceptable change in the variation over time.

At 110, a fault in the speed brake system 20 may be predicted based on the variation comparison. For example, a fault in the speed brake system 20 may be predicted when the variation comparison has been determined to satisfy a predetermined threshold value. In this manner, the controller 30 and/or the computer 40 may determine if the variation comparison is acceptable. The term "satisfies" the threshold is used herein to mean that the variation comparison satisfies the predetermined threshold, such as being equal to, less than, or greater than the threshold value. It will be understood that such a determination may easily be altered to be satisfied by a positive/negative comparison or a true/false comparison. For example, a less than threshold value can easily be satisfied by applying a greater than test when the data is numerically inverted.

At 112, the controller 30 and/or the computer 40 may provide an indication of the fault in the speed brake system 20 predicted at 110. The indication may be provided in any suitable manner at any suitable location including in the aircraft 10 and at the ground system 42. By way of non-limiting example, the indication may be provided on a primary flight display (PFD) in the cockpit 16 of the aircraft 10.

In implementation, the reference values and comparisons may be converted to an algorithm to predict faults in the speed brake system 20. Such an algorithm may be converted to a computer program including a set of executable instructions, which may be executed by the controller 30 and/or the computer 40. The computer program may also take into account various information such as binary flags for commanded operations from the pilot and/or auto pilot as well as standard parameters recorded by onboard systems such as altitude and air/ground speed in predicting the fault in the speed brake system 20. Such a computer program may determine faults including out of range sensors readings, speed brake handle faults, speed brake/spoiler position faults, etc. Indications may then be given as to the time proximity of when the fault is likely to occur and the severity of the fault type. If the controller 30 ran the program, then the suitable indication may be provided on the aircraft 10 and/or may be uploaded to the ground system 42. Alternatively, if the computer 40 ran the program, then the indication may be uploaded or otherwise relayed to the aircraft 10. Alternatively, the indication may be relayed such that it may be provided at another location such as an airline control or flight operations department.

It will be understood that the method of predicting a speed brake fault is flexible and the method illustrated is merely for illustrative purposes. For example, the sequence of steps depicted is for illustrative purposes only, and is not meant to limit the method 100 in any way as it is understood that the steps may proceed in a different logical order or additional or intervening steps may be included without detracting from embodiments of the invention. By way of non-limiting example, variation comparisons may be defined over a number of flights of the aircraft 10 to define multiple variation comparisons. The prediction of the fault may be based on the multiple variation comparisons. More specifically, a fault may be predicted when the variation parameter exceeds the variation reference value a predetermined number of times over a predetermined number of lights. Further, the method may include determining the number of position signals that are outside a defined range for each spoiler 22 and such information may be compared to historic data for that particular aircraft and related to the fleet.

Figure 4:
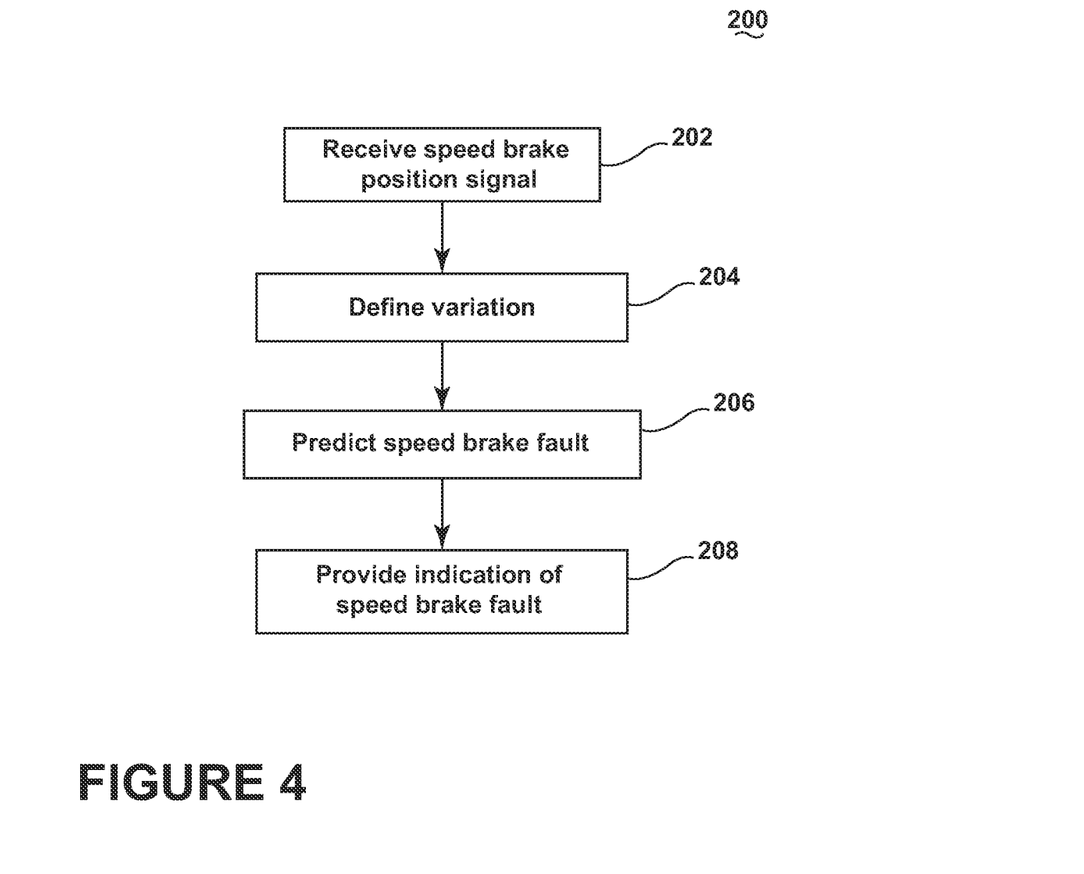
FIG. 4 is a flowchart showing another method of predicting a speed brake fault in an aircraft according to an embodiment of the invention.

In accordance with an alternative embodiment of the invention, FIG. 4 illustrates a method 200, which may be used for predicting a speed brake fault, which can include a failure. The method 200 is similar to the method 100 and includes many of the same features as the method 100. Therefore, it will be understood that the description of the like portions applies to the method 200 unless otherwise noted. The method 200 begins at 202 by receiving a position signal from at least one of the one of the speed brake position sensors 28. At 204, a variation in the position signal relative to a reference position may be determined. The reference position value may include any number of reference values related to the speed brake system 20. By way of non-limiting example, determining the variation may include comparing the position signal to the reference position. The reference position may be a set position such as a position corresponding to a maximum angle of at least one of the multiple spoilers 22. In such an instance, determining the variation may include determining from the position signal a time for at least one of the multiple spoilers 22 to move to the set position. Alternatively, determining the variation may include determining from the position signal a time for at least one of the multiple control surfaces to reach the reference position. In this manner a variety of variations may be determined including a variation in the time it takes one of the multiple spoilers 22 to reach its maximum angle after the speed brake handle 24 moves as compared to historical timings for that particular aircraft and/or related to the fleet, a variation in the time it takes one of the multiple spoilers 22 to be deployed after landing as compared to historical timings for that particular aircraft and/or related to the fleet, etc.

At 206, a fault in the speed brake system 20 may be predicted based on the variation. With respect to the time variations described above, predicting the fault may include comparing the determined time to a reference time. For example, the reference time may be a historical time value. In implementation, the reference values and comparisons may be a computer program including a set of executable instructions, which may be executed by the controller 30 and/or the computer 40. At 208, the controller 30 and/or the computer 40 may provide an indication of the fault in the aircraft 10 and at the ground system 42.

It will be understood that the method 200 of predicting a speed brake fault is flexible and the method illustrated is merely for illustrative purposes. For example, a fault may be predicted when the variation exceeds a variation reference value a predetermined number of times over a predetermined number of flights. Further, the method may include determining the number of comparisons that are outside a defined range and such information may be compared to historic data for that particular aircraft and/or related to the fleet to predict a fault of the speed brake system 20.

Any number of faults may be predicted by the above embodiments of the invention. For example, a fault may be predicted when the determined variations indicates one spoiler differs from its historical angle for a given speed brake input position. For example, a fault with a spoiler position sensor or a fault with an actuator may be predicted when it is determined that the angle of a spoiler 22 when deployed differs from its historical angle while the other of the multiple spoilers are determined to be at correct positions. Further, a fault with an interlock for the spoiler 22, such as an interlock cable for the spoiler 22, may be predicted when the variations indicate that the position of all of the multiple spoilers on a wing differ from the historical information. A fault may be predicted with a speed brake control unit when the variation indicates that all of the multiple spoilers are not deployed and it is determined that the handle position corresponds to a deployment position of the multiple spoilers.

Technical effects of the above described embodiments include that data gathered by the aircraft during flight may be utilized to predict a speed brake fault. Currently the recording of fault occurrences may require the fault to be entered manually into a database this is costly and may not obtain all the relevant information. Further, there is currently no manner to predict a fault of a speed brake. The above described embodiments may result in many benefits including improved flight performance, which can have a positive impact on both operating costs and safety. The above embodiments allow accurate predictions to be made regarding the speed brake system faults. This allows for cost savings by reducing maintenance cost, rescheduling cost, and minimizing operational impacts including minimizing the time aircraft are grounded.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of predicting a speed brake fault in an aircraft having a speed brake system including multiple control surfaces, the method comprising:
determining a position of at least one of the multiple control surfaces;
comparing the determined position to a reference position value to define a position comparison;
determining from the position comparison a variation parameter indicative of the variation of the determined position from the reference position value;
comparing the variation parameter to a variation reference value to define a variation comparison;
predicting a fault in the speed brake system based on the variation comparison; and
providing an indication of the predicted fault.

2. The method of claim 1 wherein the determining a portion of at least one of the multiple control surfaces comprises receiving a position signal, from at least one position sensor, indicative of the position of the at least one of the multiple control surfaces.

3. The method of claim 1 wherein the determining the position comprises determining positions of a plurality of the multiple control surfaces.

4. The method of claim 3 wherein the determining comprises receiving a plurality of position signals, with each position signal corresponding to a different one of the plurality of the multiple control surfaces.

5. The method of claim 1 wherein the reference position value comprises a predetermined position value of the at least one of the multiple control surfaces.

6. The method of claim 1 wherein the reference position value is based on historical information corresponding to positions of the at least one of the multiple control surfaces.

7. The method of claim 1, further comprising defining variation comparisons over a number of flights of the aircraft to define multiple variation comparisons.

8. The method of claim 7 wherein the predicting the fault is based on the multiple variation comparisons.

9. The method of claim 8 wherein the fault is predicted when the variation comparison indicates the variation parameter exceeds the variation reference value a predetermined number of times over a predetermined number of flights.

10. The method of claim 1 wherein providing the indication comprises providing the indication on a PFD in a cockpit of the aircraft.

11. The method of claim 1 wherein the control surfaces comprise spoilers.

12. A method of predicting a speed brake fault in an aircraft having a speed brake system including multiple control surfaces and a handle, which controls a position of the multiple control surfaces, the method comprising:
   determining a position of at least one of the multiple control surfaces;
   determining a position of the handle;
   defining a reference position value for the at least one of the multiple control surfaces based on the determined position of the handle;
   comparing the determined position of the at least one of the multiple control surfaces to the defined reference position value;
   predicting a fault in the speed brake system based on the comparison; and
   providing an indication of the predicted fault.

13. A method of predicting a speed brake fault in an aircraft having a speed brake system including multiple control surfaces, a handle for setting the position of the multiple control surfaces, and at least one control surface position sensor, the method comprising:
   receiving a position signal from the at least one control surface position sensor;
   determining from the position signal a time for at least one of the multiple control surfaces to move to a reference position
   comparing the determined time to a reference value;
   predicting a fault in the speed brake system based on the comparing; and
   providing an indication of the predicted fault.

14. The method of claim 13 wherein the reference value is a historical time value.

15. The method of claim 13, further comprising repeating the receiving, determining, and comparing over a number of flights of the aircraft to define multiple comparisons.

16. The method of claim 15 wherein the fault is predicted when the multiple comparisons indicate the determined time exceeds the reference value a predetermined number of times over a predetermined number of flights.

* * * * *

UNITED STATES PATENT AND TRADEMARK OFFICE
CERTIFICATE OF CORRECTION

| | |
|---|---|
| PATENT NO. | : 9,449,438 B2 |
| APPLICATION NO. | : 14/536898 |
| DATED | : September 20, 2016 |
| INVENTOR(S) | : Catt et al. |

It is certified that error appears in the above-identified patent and that said Letters Patent is hereby corrected as shown below:

On the Title Page

On Page 2, in Item (56), under "FOREIGN PATENT DOCUMENTS", in Column 2, Line 12, delete "8/1998" and insert -- 8/1999 --, therefor.

In the Specification

In Column 1, Line 8, delete "14/065,9671," and insert -- 14/065,967), --, therefor.

In Column 1, Line 11, delete "130687131," and insert -- 13068713), --, therefor.

In Column 4, Line 57, delete "fault Among" and insert -- fault. Among --, therefor.

In Column 7, Line 8, delete "lights." and insert -- flights. --, therefor.

In the Claims

In Column 10, Line 19, in Claim 13, delete "position" and insert -- position; --, therefor.

Signed and Sealed this
Tenth Day of January, 2017

Michelle K. Lee
*Director of the United States Patent and Trademark Office*